US006847626B1

(12) United States Patent
Carneal et al.

(10) Patent No.: US 6,847,626 B1
(45) Date of Patent: Jan. 25, 2005

(54) METHOD AND APPARATUS FOR MULTIPLE ACCESS IN A COMMUNICATION SYSTEM

(75) Inventors: Bruce L. Carneal, Del Mar, CA (US); Karl E. Moerder, Poway, CA (US); Donald W. Becker, Rancho Santa Fe, CA (US); Min Zhu, San Diego, CA (US)

(73) Assignee: Tachyon, Inc., San Diego, CA (US)

( * ) Notice: Subject to any disclaimer, the term of this patent is extended or adjusted under 35 U.S.C. 154(b) by 0 days.

(21) Appl. No.: 09/407,639

(22) Filed: Sep. 28, 1999

Related U.S. Application Data (63) Continuation-in-part of application No. 09/347,879, filed on Jul. 6, 1999, now abandoned, which is a continuation-in-part of application No. 09/330,102, filed on Jun. 10, 1999, now abandoned.
(60) Provisional application No. 60/093,622, filed on Jul. 21, 1998.

(51) Int. Cl.[7] .............................. H04B 7/00; H04Q 7/20
(52) U.S. Cl. ........................ 370/345; 370/347; 370/348; 370/442; 370/443; 455/509; 455/515
(58) Field of Search ................................ 455/507, 517, 455/509, 515; 370/345, 347, 348, 442, 443, 445, 446, 447

(56) References Cited

U.S. PATENT DOCUMENTS

| | | |
|---|---|---|
| 3,611,435 A | 10/1971 | Cooper |
| 3,818,453 A | 6/1974 | Schmidt et al. |
| 4,543,574 A | 9/1985 | Takagi et al. |
| 4,545,061 A | 10/1985 | Hileman |
| 4,555,782 A | 11/1985 | Alaria et al. |
| 4,736,371 A | 4/1988 | Tejima et al. |
| 4,742,512 A | 5/1988 | Akashi et al. |
| 4,763,325 A | 8/1988 | Wolfe et al. |
| 4,774,707 A | 9/1988 | Raychaudhuri |

(List continued on next page.)

FOREIGN PATENT DOCUMENTS

| | | |
|---|---|---|
| EP | 0 026 603 | 4/1981 |
| EP | 0 097 309 | 1/1984 |
| EP | 0 584 820 A1 | 3/1994 |
| EP | 0 621 707 A2 | 4/1994 |
| EP | 0 633 671 A2 | 1/1995 |
| EP | 0 722 228 A2 | 7/1996 |
| EP | 0 765 096 A2 | 8/1996 |

(List continued on next page.)

OTHER PUBLICATIONS

Guo Q, et al. (Sep. 18, 1994) Aggressive packet reservation multiple access using signatures. IEEE International Symposium on Personal, Indoor and Mobile Radio Communications, 1247–1253.

*Primary Examiner*—Simon Nguyen
(74) *Attorney, Agent, or Firm*—Knobbe Martens Olson & Bear LLP (57) ABSTRACT

A communication system comprising three communication resources: a contention-type access block, a non-contention access block and a second non-contention access block called a reserved block. Each time that a remote unit has a block of data to transfer to a hub station, it sends the block of data over the contention-type access block. It also sends a corresponding notification message over the reserved block. If the hub station receives the notification message but not the block of data, it sends a response message to the remote unit which designates a resource within the non-contention access block. The remote unit then sends the block of data to the hub station over the designated resource.

19 Claims, 5 Drawing Sheets

U.S. PATENT DOCUMENTS

| | | |
|---|---|---|
| 4,811,200 A | 3/1989 | Wagner et al. |
| 4,837,786 A | 6/1989 | Gurantz et al. |
| 4,841,527 A | 6/1989 | Raychaudhuri et al. |
| 4,868,795 A | 9/1989 | McDavid et al. |
| 5,012,469 A | 4/1991 | Sardana |
| 5,121,387 A | 6/1992 | Gerhardt et al. |
| 5,159,592 A | 10/1992 | Perkins |
| 5,165,092 A * | 11/1992 | Rickenbach et al. ........ 370/458 |
| 5,166,929 A | 11/1992 | Lo |
| 5,172,375 A | 12/1992 | Kou |
| 5,216,427 A | 6/1993 | Yan et al. |
| 5,239,545 A | 8/1993 | Buchholz |
| 5,239,677 A | 8/1993 | Jasinski |
| 5,276,703 A | 1/1994 | Budin et al. |
| 5,297,144 A | 3/1994 | Gilbert et al. |
| 5,345,583 A | 9/1994 | Davis |
| 5,381,443 A | 1/1995 | Borth et al. |
| 5,384,777 A | 1/1995 | Ahmadi et al. |
| 5,420,864 A | 5/1995 | Dahlin et al. |
| 5,471,473 A | 11/1995 | Tejima |
| 5,485,464 A | 1/1996 | Strodtbeck et al. |
| 5,490,087 A | 2/1996 | Redden et al. |
| 5,499,243 A | 3/1996 | Hall |
| 5,537,397 A | 7/1996 | Abramson |
| 5,539,730 A | 7/1996 | Dent |
| 5,541,924 A | 7/1996 | Tran et al. |
| 5,550,992 A | 8/1996 | Hashimoto |
| 5,566,168 A | 10/1996 | Dent |
| 5,570,355 A | 10/1996 | Dail et al. |
| 5,577,024 A | 11/1996 | Malkamaki et al. |
| 5,586,121 A | 12/1996 | Moura et al. |
| 5,594,738 A * | 1/1997 | Crisler et al. ............... 370/347 |
| 5,612,703 A | 3/1997 | Mallinckrodt |
| 5,613,195 A | 3/1997 | Ooi |
| 5,615,212 A | 3/1997 | Ruszczyk et al. |
| 5,638,361 A | 6/1997 | Ohlson et al. |
| 5,642,354 A | 6/1997 | Spear |
| 5,644,576 A | 7/1997 | Bauchot et al. |
| 5,651,009 A | 7/1997 | Perreault et al. |
| 5,652,892 A | 7/1997 | Ugajin |
| 5,673,322 A | 9/1997 | Pepe et al. |
| 5,677,909 A * | 10/1997 | Heide .......................... 370/347 |
| 5,678,208 A | 10/1997 | Kowalewski et al. |
| 5,696,903 A | 12/1997 | Mahany |
| 5,701,298 A | 12/1997 | Diachina et al. |
| 5,704,038 A | 12/1997 | Mueller et al. |
| 5,706,278 A | 1/1998 | Robillard et al. |
| 5,732,328 A | 3/1998 | Mitra et al. |
| 5,734,833 A | 3/1998 | Chiu et al. |
| 5,745,485 A | 4/1998 | Abramson |
| 5,758,088 A | 5/1998 | Bezaire et al. |
| 5,768,254 A | 6/1998 | Papadopoulos et al. |
| 5,784,362 A | 7/1998 | Turina |
| 5,790,533 A | 8/1998 | Burke et al. |
| 5,790,535 A | 8/1998 | Kou |
| 5,790,551 A | 8/1998 | Chan |
| 5,790,939 A | 8/1998 | Malcolm et al. |
| 5,790,940 A | 8/1998 | Laborde et al. |
| 5,796,726 A | 8/1998 | Hassan et al. |
| 5,802,061 A | 9/1998 | Agarwal |
| 5,809,093 A | 9/1998 | Cooper |
| 5,809,400 A | 9/1998 | Abramsky et al. |
| 5,809,414 A | 9/1998 | Coverdale et al. |
| 5,815,652 A | 9/1998 | Ote et al. |
| 5,815,798 A | 9/1998 | Bhagalia et al. |
| 5,818,831 A | 10/1998 | Otonari |
| 5,818,845 A | 10/1998 | Moura et al. |
| 5,818,887 A | 10/1998 | Sexton et al. |
| 5,822,311 A | 10/1998 | Hassan et al. |
| 5,828,655 A | 10/1998 | Moura et al. |
| 5,848,064 A | 12/1998 | Cowan |
| 5,859,852 A | 1/1999 | Moura et al. |
| 5,862,452 A | 1/1999 | Cudak et al. |
| 5,872,820 A | 2/1999 | Upadrasta |
| 5,889,766 A | 3/1999 | Ohnishi et al. |
| 5,905,719 A | 5/1999 | Arnold et al. |
| 5,909,447 A | 6/1999 | Cox et al. |
| 5,910,945 A | 6/1999 | Garrison et al. |
| 5,915,207 A | 6/1999 | Dao et al. |
| 5,926,458 A | 7/1999 | Yin |
| 5,946,602 A | 8/1999 | Sayegh |
| 5,958,018 A | 9/1999 | Eng et al. |
| 5,959,982 A | 9/1999 | Federkins et al. |
| 5,960,001 A | 9/1999 | Shaffer et al. |
| 5,963,557 A | 10/1999 | Eng |
| 5,966,412 A | 10/1999 | Ramaswamy |
| 5,966,636 A | 10/1999 | Corrigan et al. |
| 6,115,390 A * | 9/2000 | Chuah ........................ 370/348 |
| 6,151,329 A * | 11/2000 | Berrada et al. ............. 370/348 |
| 6,188,689 B1 * | 2/2001 | Katsube et al. ............. 370/252 |
| 6,240,083 B1 * | 5/2001 | Wright et al. ............... 370/348 |
| 6,370,153 B1 * | 4/2002 | Eng ........................... 370/438 |

FOREIGN PATENT DOCUMENTS

| | | |
|---|---|---|
| EP | 0 755 164 A2 | 1/1997 |
| EP | 0 831 669 A2 | 3/1998 |
| EP | 0 889 660 A2 | 1/1999 |
| EP | 0 889 664 A2 | 1/1999 |
| EP | 0 901 253 A2 | 3/1999 |
| EP | 0 912 015 A2 | 4/1999 |
| EP | 0 912 016 A2 | 4/1999 |
| EP | 0 913 968 A | 5/1999 |
| EP | 0 913 970 A1 | 5/1999 |
| EP | 0 915 592 A1 | 5/1999 |
| EP | 0 917 317 A1 | 5/1999 |
| EP | 0 920 226 A2 | 6/1999 |
| EP | 0 923 266 | 6/1999 |
| WO | 94/19530 | 9/1994 |
| WO | WO95/16330 | 11/1994 |
| WO | 95/34153 | 12/1995 |
| WO | 96/05690 | 2/1996 |
| WO | 96/11535 | 4/1996 |
| WO | 97/11566 | 3/1997 |
| WO | 07/38502 | 10/1997 |
| WO | 97/37457 | 10/1997 |
| WO | 97/47158 | 12/1997 |
| WO | 97/50249 | 12/1997 |
| WO | 98/12829 | 3/1998 |
| WO | 98/12833 | 3/1998 |
| WO | 98/16046 | 4/1998 |
| WO | 98/18280 | 4/1998 |
| WO | 98/19466 | 5/1998 |
| WO | 98/20724 | 5/1998 |
| WO | 98/23112 | 5/1998 |
| WO | 98/24250 | 6/1998 |
| WO | 98/37669 | 8/1998 |
| WO | 98/37706 | 8/1998 |
| WO | 98/44747 | 10/1998 |
| WO | 98/47236 | 10/1998 |
| WO | 98/49625 | 11/1998 |
| WO | 98/54858 | 12/1998 |
| WO | 98/54859 | 12/1998 |
| WO | 99/04338 | 1/1999 |
| WO | 99/04508 | 1/1999 |
| WO | 99/04509 | 1/1999 |
| WO | 99/04521 | 1/1999 |
| WO | 99/05828 | 2/1999 |
| WO | 99/13616 | 3/1999 |
| WO | 99/14963 | 3/1999 |
| WO | 99/16201 | 4/1999 |
| WO | 99/19996 | 4/1999 |

| | | | | | | |
|---|---|---|---|---|---|---|
| WO | 99/19999 | 4/1999 | | WO | 99/21378 | 4/1999 |
| WO | 99/21287 | 4/1999 | | WO | 99/21381 | 4/1999 |
| WO | 99/21291 | 4/1999 | | WO | 99/22500 | 6/1999 |
| WO | 99/21296 | 4/1999 | | WO | 99/39480 | 8/1999 |
| WO | 99/21328 | 4/1999 | | | | |
| WO | 99/21329 | 4/1999 | | | | |

\* cited by examiner

METHOD AND APPARATUS FOR MULTIPLE ACCESS IN A COMMUNICATION SYSTEM

RELATED APPLICATIONS

This is a continuation-in-part application of application Ser. No. 09/347,879, abandoned, filed Jul. 6, 1999 now abandoned, which is a continuation-in-part of application Ser. No. 09/330,102, abandoned, filed Jun. 10, 1999, which claims priority to U.S. Provisional Application No. 60/093, 622, filed Jul. 21, 1998, each of which is hereby incorporated by reference.

BACKGROUND OF THE INVENTION

I. Field of the Invention

This invention relates generally to communication systems. More specifically, the invention relates to multiple access communication systems.

II. Description of the Related Art

The use of wireless communication systems for the transmission of digital data is becoming more and more pervasive. In a wireless system, the most precious resource in terms of cost and availability is typically the wireless link itself. Therefore, one major design goal in designing a communication system comprising a wireless link is to efficiently use the available capacity of the wireless link. In addition, it is also desirable to reduce the delay associated with use of the link.

In a system in which multiple units compete for finite system resources, a means must be developed to regulate access to such resources. In a digital data system, remote units tend to generate bursty data. The bursty data is characterized in that it has a high peak-to-average traffic ratio, meaning that blocks of data are transferred during short periods of time interposed between significantly longer periods of idleness. Dedication of an individual communication channel to each active unit does not result in efficient use of system capacity in a system in which units generate bursty data because, during those times when the remote unit is not utilizing the system, the allocated resources remain idle. The use of dedicated channels also may impose a hard limit on the number of remote units which may simultaneously use the system, regardless of the usage patterns of the remote units. In addition, the use of dedicated channels may cause unacceptable delay if the slice of resources allocated to each remote unit is so small that data transfer rates are greatly compromised.

The characteristics of the inbound and outbound traffic tend to differ significantly in a digital data system. For example, in a system which provides wireless Internet services, a typical outbound transmission from a remote unit is relatively short, such as a request for a web page. However, a typical inbound data transfer to a remote unit tends to be rather large. For example, in response to a request for a web page, the system may transfer a significant amount of data. Because the characteristics of the inbound and outbound links are very different, system efficiency may be increased by developing two distinct protocols for the inbound and outbound links.

A random access ALOHA protocol was developed for use in the outbound link from a remote unit in a digital data system. The basic idea behind ALOHA is quite simple: the remote units transmit whenever they have data to send. If the remote units are using a communication resource which can only be accessed by one remote unit at a time, the information from each remote unit is destroyed if two units transmit at the same time causing a collision. In a system where the remote unit can monitor the random access transmissions, the remote unit may monitor the transmissions in order to determine whether its transmission is the victim of a collision. In a system in which the remote unit does not or cannot monitor the random access transmissions, the remote unit may detect a collision based upon the expiration of a timer without receipt of an acknowledgment message received from a hub station in response to a transmission. According to standard ALOHA operation, whenever a collision occurs, the remote unit waits a random amount of time and retransmits the data. The duration of the wait is random so that the colliding remote units do not generate collisions in lockstep over and over again.

Figure 1:
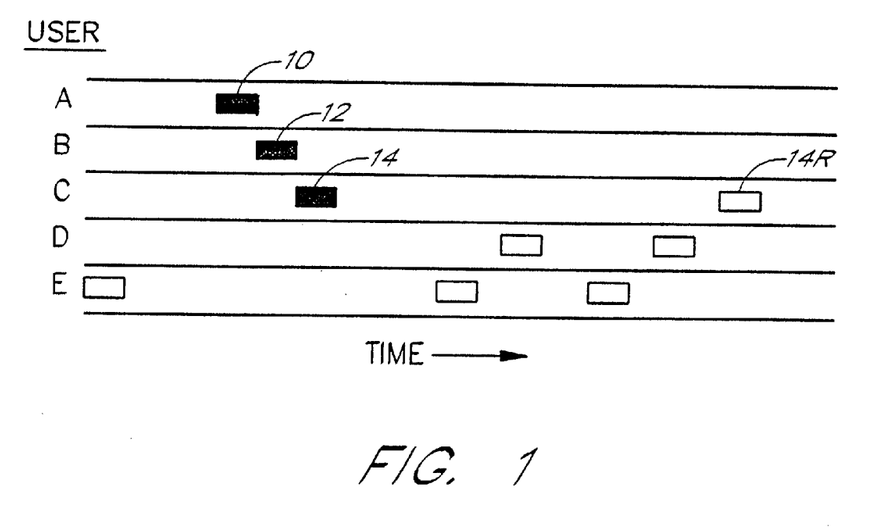
FIG. 1 is a timing diagram showing the operation of a pure ALOHA random multiple access system.

FIG. 1 is a timing diagram showing the operation of a pure ALOHA random multiple access system. In FIG. 1, five remote units designated A, B, C, D and E are transmitting packets of data within a common communication channel. Whenever two remote units transmit at the same time, a collision occurs and both transmissions are lost. In a pure ALOHA system, if the first bit of a new transmission overlaps just the last bit of a transmission already in progress, both transmissions are totally destroyed and both have to be retransmitted at some other time. For example, in the frequency modulated (FM) channel shown in FIG. 1 where no two packets may contemporaneously be transmitted, a packet 12 transmitted by the remote unit B collides with a packet 10 transmitted by the remote unit A and a packet 14 transmitted by the remote unit C. The remote unit A must retransmit the information in the packet 10, the remote unit B must retransmit the information in the packet 12 and the remote unit C must retransmit the information in the packet 14. FIG. 1 shows the remote unit C retransmitting the packet 14 as a packet 14R.

In a pure ALOHA system, if the average packet transfer rate is low, most packets are transferred without a collision. As the average packet transfer rate begins to increase, the number of collisions increases and, hence, the number of retransmissions also increases. As the system loading increases linearly, the probability of retransmissions and multiple retransmissions increases exponentially. At some point as system loading increases, the probability of successful transmission falls below a reasonable number and the system becomes practically inoperable. In a pure ALOHA system, the best channel utilization which can be achieved is approximately 18%, the so-called maximum channel utilization. Below 18%, the system is underutilized. Above 18%, the number of collisions increases such that the throughput of the system begins to fall. Operating above maximum channel utilization is referred to as over channel utilization. Under conditions of over channel utilization, the average delay of the system increases rapidly as the throughput of the system falls and the stability of the system is endangered.

The introduction of a geosynchronous satellite link within a digital communication system complicates the multiple access dilemma. The use of a geosynchronous satellite typically introduces a 270 millisecond (msec) delay between transmission of a signal from a remote unit and reception of that same signal at a hub station. For this reason, scheduled access schemes which require the remote unit to request system resources before beginning each transmission introduce about half a second of delay into each transmission. The delay associated with scheduled transmissions may be readily apparent to the frustrated system user.

If an ALOHA system is implemented in a satellite system in which the remote units can't or don't monitor the random access channel, in the event of a collision, the remote unit does not know of the collision for at least 540 msec. In addition to the notification delay, the remote unit typically must wait some random amount of time before retransmitting the data (to avoid lockstep retransmissions). The retransmitted signal is once again subjected to the 270 msec time delay. The cumulative delay of such a transmission can easily exceed one second. In a fully loaded system, the delay can be significantly longer due to the increased probability of repeated collisions. Although these delays are not incurred with each transmission, they can be frustrating to the user when incurred.

Therefore, there is a need for a multiple access system which provides advantageous use of system resources as well as tolerable delay.

SUMMARY

A communication system is comprised of three communication resources: a contention-type access block, a non-contention access block and a second non-contention access block called a reserved block. Each time that a remote unit has a block of data to transfer to a hub station, it sends the block of data over the contention-type access block. It also sends a corresponding notification message over the reserved block. If the hub station receives the notification message but not the block of data, it sends a response message to the remote unit which designates the resource within the non-contention access block. The remote unit sends the block of data over the designated resource.

BRIEF DESCRIPTION OF THE DRAWINGS

The features, objectives, and advantages of the invention will become more apparent from the detailed description set forth below when taken in conjunction with the drawings wherein like parts are identified with like reference numeral throughout and wherein.

DETAILED DESCRIPTION OF THE INVENTION

One problem encountered with prior art random access schemes is that in the event of a collision, the remote unit may not know of the collision for some time. The hub station cannot detect which remote units are involved when a collision occurs and, therefore, cannot immediately notify the affected remote units when a collision occurs. Therefore, unless the remote unit can somehow monitor the random access transmissions, the remote unit waits for an acknowledgment message from the hub station. If a corresponding time-out period expires and no acknowledgment message is received, the remote unit assumes a collision has occurred. In a pure ALOHA system, the remote unit also waits a random amount of time before attempting to retransmit after a collision is deemed to have occurred. In some cases, the retransmission also fails and the retransmission process is repeated. The delay which is introduced by the retransmission and possible multiple retransmissions can become quite intolerable.

The invention provides a multiple access means and method which reduces or eliminates the excessive delay introduced by multiple retransmissions. A reserved block of resources is used to notify the hub station whenever a remote unit initially attempts to access the system over a contention-type access communication resource. The notification of the hub station allows the hub station to accurately detect the occurrence of a collision (or other failure mode) and to identify the remote units that were involved in the collision. When a collision occurs, the hub station assigns to each remote unit involved in the collision a resource within a non-contention access communication resource over which the remote unit retransmits the block of data. The resource is preferably dedicated to the remote unit and, therefore, the retransmission of the block of data is not subjected to a risk of collision. Thus, because the notification message and retransmitted block of data are transmitted over non-contention type communication resources, almost no block of data is subjected to more than one collision. In addition to decreasing the time delay associated with the retransmission process, the contention-type resources are also unburdened to the extent that they are not required to carry a large volume of retransmissions. The probability of collisions in the contention-type access block is thus reduced.

Figure 2:
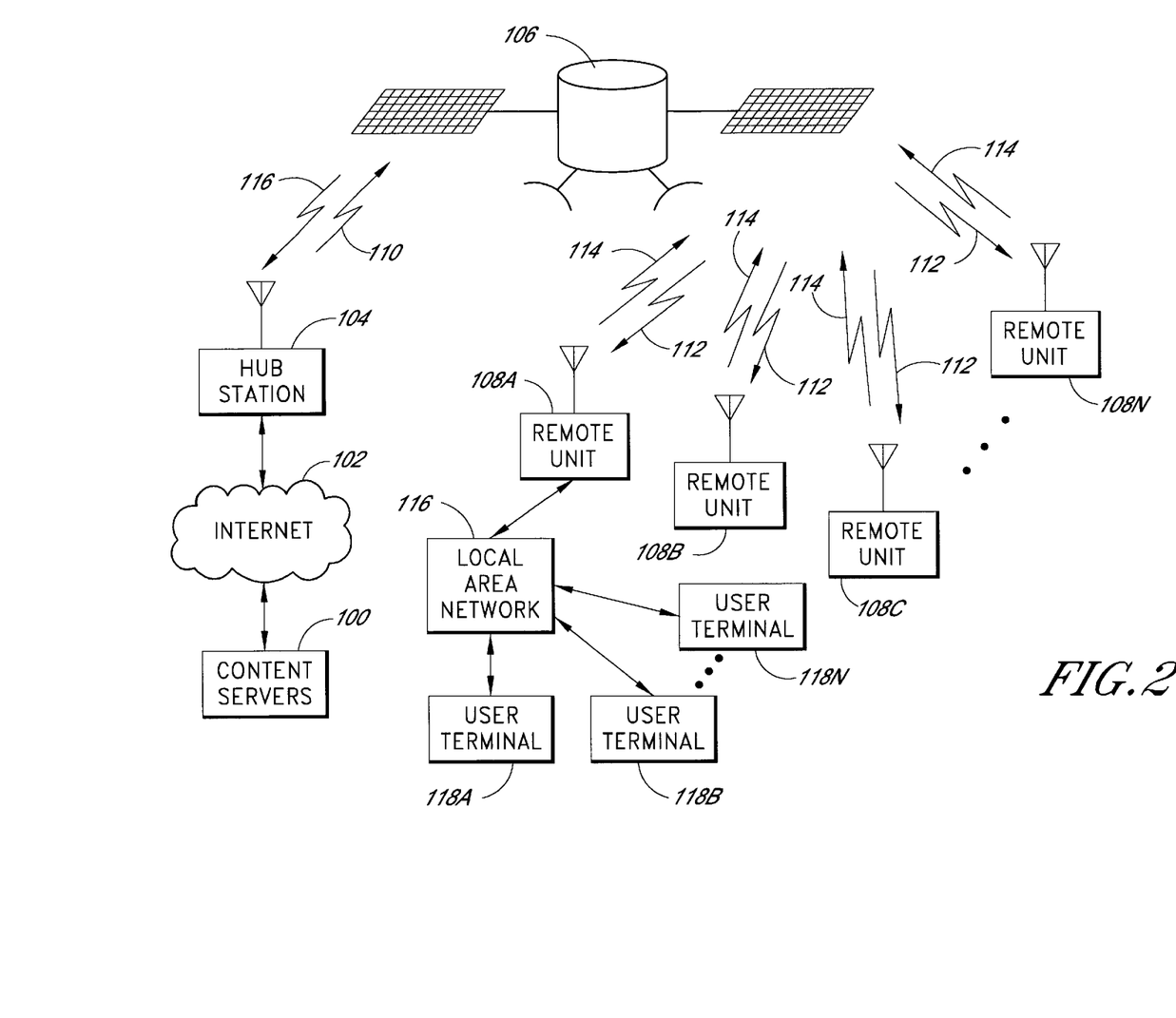
FIG. 2 is a block diagram illustrating a system according to the invention.

FIG. 2 is a block diagram illustrating an exemplifying system in which the invention may be embodied. The system in FIG. 2 provides high-speed, reliable Internet communication service over a satellite link.

In particular, in FIG. 2, content servers 100 are coupled to the Internet 102 which is in turn coupled to a hub station 104 such that the hub station 104 can request and receive digital data from the content servers 100. The hub station 104 also communicates via satellite 106 with a plurality of remote units 108A–108N. For example, the hub station 104 transmits signals over a forward uplink 110 to the satellite 106. The satellite 106 receives the signals from the forward uplink 110 and re-transmits them on a forward downlink 112. Together, the forward uplink 110 and the forward downlink 112 are referred to as the forward link. The remote units 108A–108N monitor one or more channels which comprise the forward link in order to receive remote-unit-specific and broadcast messages from the hub station 104.

In a similar manner, the remote units 108A–108N transmit signals over a reverse uplink 114 to the satellite 106. The satellite 106 receives the signals from the reverse uplink 114 and re-transmits them on a reverse downlink 116. Together, the reverse uplink 114 and the reverse downlink 116 are referred to as the reverse link. The hub station 104 monitors one or more channels which comprise the reverse link in order to extract messages from the remote units 108A–108N.

In one embodiment of the exemplifying system, each remote unit 108A–108N is coupled to a plurality of system users. For example, in FIG. 2, the remote unit 108A is shown as coupled to a local area network 116 which in turn is coupled to a group of user terminals 118A–118N. The user terminals 118A–118N may be one of many types of local area network nodes such as a personal or network computer, a printer, digital meter reading equipment or the like. When a message is received over the forward link intended for one of the user terminals 118A–118N, the remote unit 108A forwards it to the appropriate user terminal 118 over the local area network 116. Likewise, the user terminals 118A–118N can transmit messages to the remote unit 108A over the local area network 116.

In one embodiment of the exemplifying system, the remote units 108A–108N provide Internet service for a plurality of users. For example, assume that the user terminal 118A is a personal computer which executes browser software in order to access the World Wide Web. When the browser receives a request for a web page or embedded object from the user, the user terminal 118A creates a request message according to well-known techniques. The user terminal 118A forwards the request message over the local area network 116 to the remote unit 108A, also using well-known techniques. Based upon the request message, the remote unit 108A creates and transmits a wireless link request over a channel within the reverse uplink 114 and the reverse downlink 116. The hub station 104 receives the wireless link request over the reverse link. Based upon the wireless link request, the hub station 104 passes a request message to the appropriate content server 100 over the Internet 102.

In response, the content server 100 forwards the requested page or object to the hub station 104 over the Internet 102. The hub station 104 receives the requested page or object and creates a wireless link response. The hub station transmits the wireless link response over a channel within the forward uplink 110 and forward downlink 112. For example, in one embodiment of the exemplifying system, the hub station 104 operates in accordance with assignee's application entitled TRANSMISSION OF TCP/IP DATA OVER A WIRELESS COMMUNICATION CHANNEL, application Ser. No. 09/407,646, and assignee's application entitled METHOD AND SYSTEM FOR FREQUENCY SPECTRUM RESOURCE ALLOCATION, application Ser. No. 09/407,645, each of which is filed concurrently herewith and the entirety of which is hereby incorporated by reference.

The remote unit 108A receives the wireless link response and forwards a corresponding response message to the user terminal 118A over the local area network 116. In one embodiment of the exemplifying system, the process of retrieving a web page or object is executed in accordance with assignee's U.S. Pat. No. 6,282,542, entitled DISTRIBUTED SYSTEM AND METHOD FOR PREFETCHING OBJECTS, filed Aug. 5, 1998, the entirety of which is hereby incorporated by reference. In this way, a bi-directional link between the user terminal 118A and the content servers 100 is established.

In other embodiments, the hub station 104 may, for example, be connected directly to a public telephone switch or a private digital network. In such an embodiment, the remote units 108A–108N may be nodes on a local area network, home computers, handheld computers, two way pagers, wireless facsimile machines or printers, digital meter reading equipment or any manner of unit which processes digital data.

The remote units 108 may comprise or implement one or more processes which enable them to carry out the functions of the invention. Likewise, the hub station 104 may comprise or implement one or more processes which enable it to carry out the functions of the invention. The processes may be embodied, for example, within one or more integrated circuits, such as an application specific integrated circuit (ASIC), and/or may be embodied within software or firmware routines that are executed by a microcontroller or other processor.

The communication resources within the hub station 104 may be quantized into a series of communication resources according to one of a plurality of well-known techniques. For example, the communication resources may be divided into a series of CDMA channels. The CDMA channels may be defined by a series of pseudo random, nearly orthogonal sequences. Each sequence in the series defines a separate communication resource which can be used by a remote unit to communicate with the hub station. Alternatively, the system may use TDMA time slot channels to subdivide the communication resources. In a TDMA system, remote units are assigned a time slot in which to transmit. By limiting transmissions to fall within the assigned time slot, the remote units are able to share the communication resources provided by the hub station. In addition, frequency modulation (FM), amplitude modulation (AM), a combination of the foregoing or many other communication techniques may be used to quantize the communication resources.

Figure 3:
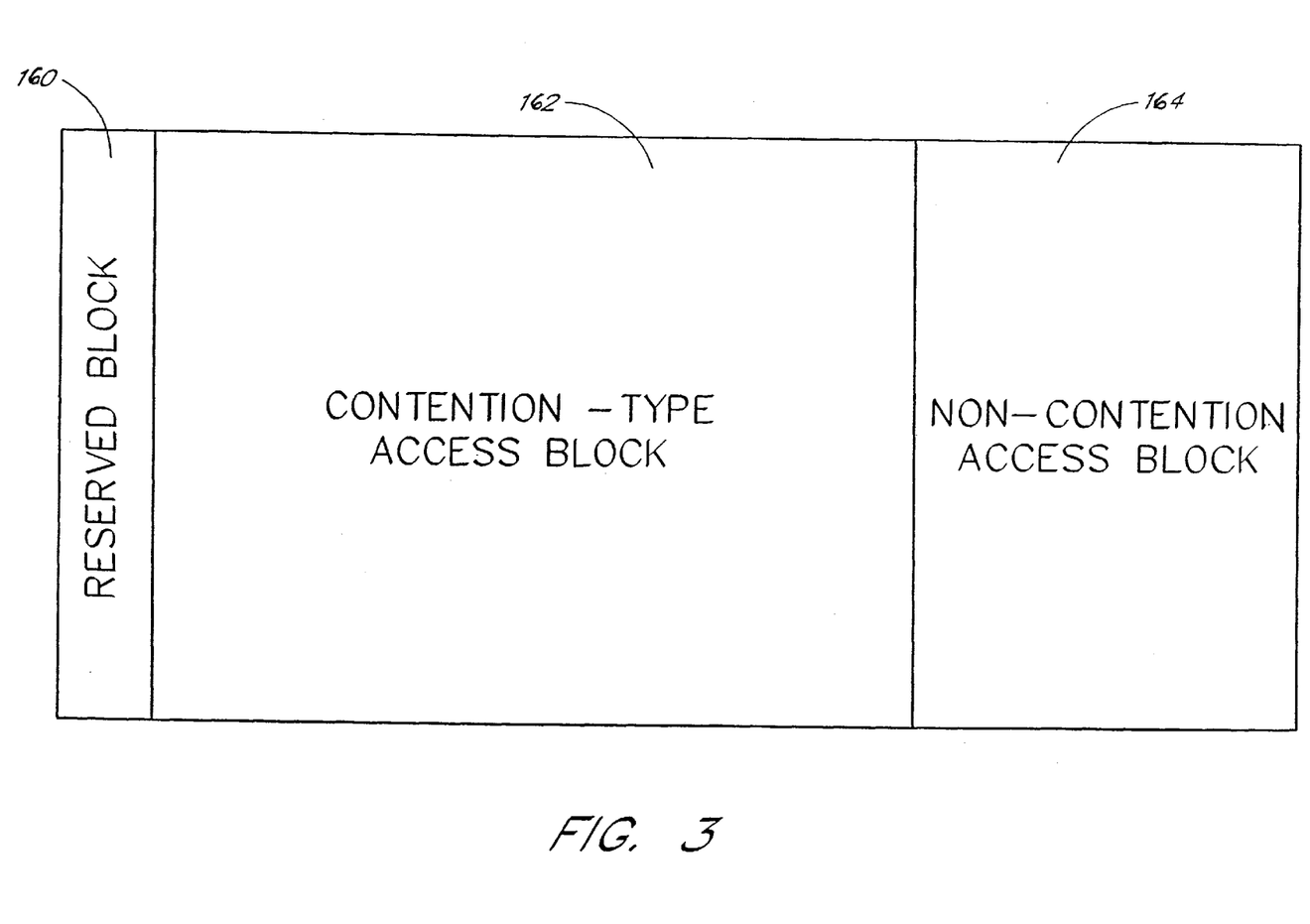
FIG. 3 is a conceptual diagram showing allocation of communication resources according to the invention.

FIG. 3 is a conceptual diagram showing allocation of communication resources according to the invention. The communication resources are divided into three resource allocation blocks. A reserved block 160 comprises a set of resources assigned and individually dedicated to an active remote unit. The reserved block may be implemented as any one of a variety of well known non-contention access mechanisms in which the transmission from one remote unit does not prevent another remote unit from communicating. For example, the reserved block may be comprised of a set of time multiplexed spread spectrum channels or a set of FDMA or TDMA channels. The multiple access and communication format of the reserved block 160 may be different from the remaining resource allocation blocks. As described below, the reserved block 160 is used to transfer notification messages from the remote units to the hub station. The resources allocated to the reserved block 160 are small in size compared to the total available communication resources. For example, in the preferred embodiment, the reserved block 160 consumes less than about 1% of the available communication resources. In other embodiments, the reserved block 160 may consume less than 5%, 4%, 3% or even 2% of the available communication resources. In one embodiment, the system operates in accordance with assignee's co-pending application entitled CHANNEL ENCODING AND DECODING METHOD AND APPARATUS, application Ser. No. 09/407,644, filed concurrently herewith, the entirety of which is hereby incorporated by reference.

The second resource allocation block is a contention-type access block 162. In contention-type access, multiple users share a common channel or channels in a way that can lead to conflicts between users. In one embodiment, the contention-type access block 162 is comprised of a set of random access resources. For example, the contention-type access block 162 may be an ALOHA access channel in which user transmissions are subjected to collision. The contention-type access block 162 is used for initial attempts to transfer blocks of data from the remote units 104 to the hub station 102.

The third resource allocation block is a non-contention access block 164. In non contention-type access, the transmissions from one remote unit do not prevent another remote unit from communicating. In one embodiment, the non-contention access block 164 is a scheduled access block. The non-contention access block 164 is used to transfer blocks of data that were unsuccessfully transferred using the contention-type access block 162. In one embodiment, the system operates in accordance with assignee's co-pending application entitled VECTORED DEMODULATION AND FREQUENCY ESTIMATION APPARATUS AND METHOD, application Ser. No. 09/407, 642, filed concurrently herewith, the entirety of which is hereby incorporated by reference.

When a remote unit sends a message containing a block of data over the contention-type access block 162, it typically includes within the message the block of data, self identification and other information used by the system. The block of data itself may comprise, for example, Internet communications such as an email message or a request for a web page, an electronic file, a short message, FAX data or other digital data. Each time that a remote unit transmits a block of data using a communication resource within the contention-type access block 162, it also sends a notification message within the reserved block 160. The notification message is not subject to collisions. Because the notification message is generally significantly smaller than the corresponding block of data, a relatively small quantity of communication resources are needed to transfer the notification message.

In one embodiment, the notification message takes on one of two values. A first message may simply indicate the presence of the remote unit within the coverage area and a second message may indicate that the remote unit is transmitting a corresponding block of data. In the preferred embodiment, the communication format used on the reserved block 160 results in a high probability of successful reception by the hub station. For example, the notification message should arrive at the hub station with a relatively high signal to interference ratio.

Each time that a remote unit transmits a block of data over the contention-type access block 162 and a notification message over the reserved block 160, one of four results occurs. Either the hub station receives both the block of data and the notification message or it receives the block of data but not the notification message or it receives neither the block of data nor the notification message or it receives the notification message but not the block of data. In one preferred embodiment, the failure rate of transmissions over the reserved block is less than 1 in 10,000. Also in that one preferred embodiment, it is advantageous to limit the usage of the contention-type access block 162 such that the probability of collisions is about 10%. Therefore, at least about 90% of the time, the hub station successfully receives the block of data and the notification message and transmits an acknowledgment message to the remote unit that transmitted the block of data.

An extremely small probability exists that the hub station will successfully receive the block of data but not the notification message. In such a case, the hub station simply transmits an acknowledgment message to the remote unit that transmitted the block of data in the same or similar manner as if the notification message had been received. In the very rare event that the hub station receives neither the block of data nor the notification message, the remote unit detects an acknowledgment time-out and may retransmit the block of data over the contention-type access block 162.

If the loading on the contention-type access block 162 is maintained such that an average collision rate of about less than 10% is expected, the hub station receives the notification message but not the block of data no more than about 10% of the time. In this case, the hub station transmits a response message to the remote unit which designates a resource within the non-contention access block 164 over which the remote unit may retransmit the block of data. The response message may be a remote unit-specific message, a broadcast message or other type of message. The remote unit may be designated explicitly, implicitly, with a temporary identifier or using another means.

In one embodiment, the non-contention access block 164 comprises a set of scheduled resources which may be temporarily dedicated to a chosen remote unit. Upon receipt of the response message from the hub station, the remote unit retransmits the block of data over the indicated resource within the non-contention access block 164. The message comprises the block of data and may also comprise other system information. The message comprising the block of data sent over the non-contention access block 164 may be different from the one sent over the contention-type access block 162. For example, by using the resource within the non-contention access block 164 assigned to the remote unit, the remote unit essentially identifies itself and the inclusion of self identification within the message itself may not be necessary.

The use of the non-contention access block 164 greatly reduces the probability that a block of data is subjected to more than one collision. Through this process, the delays associated with awaiting the expiration of an acknowledgment timer, waiting random amounts of time as well as the time devoted to multiple retransmissions are avoided. The average delay associated with the transmission of a block of data is thereby reduced.

In one embodiment, the resources dedicated to the non-contention access block 164 comprise approximately one quarter of the available communication resources. By examination of FIG. 3, it can be seen that the resources dedicated to the contention-type access block 162 are limited by the resources allocated to the reserved block 160 and the non-contention access block 164. Because the reserved block 160 is only a small percentage of the total available communications resources, the use of the reserved block 160 does not significantly reduce the resources available to the contention-type access block 162. The use of non-contention access block 164 unburdens the contention-type access block 162 by eliminating the use of the contention-type access block 162 for retransmission of blocks of data. By doing so, the use of the non-contention access block 164 decreases the probability of collision on the contention-type access block 162, thus increasing total system throughput and decreasing the amount of communication resources which are expended on collisions.

In addition, the use of the non-contention access block 164 significantly reduces the average delay time associated with accessing the system, especially under conditions of relatively heavy loading. The use of the non-contention access block 164 also limits the retransmission process so that the most probable worst case delay scenario is limited to the time necessary to make only one retransmission. Notice that this time delay, which is approximately equal to the round trip delay associated with transmission over a satellite, is the same delay that is associated with a perfectly scheduled access method. Therefore, the access method illustrated in FIG. 3 exhibits a much lower average delay than a perfectly scheduled access technique. In addition, because the number of retransmissions is limited, the invention exhibits a lower average delay than prior art random access systems.

Although the loading on the contention-type access block 162 must be limited in order to prevent over channel utilization and a reduction in throughput, if the non-contention access block 164 comprises scheduled channels, it may be fully utilized without any such concerns. In addition, the invention limits the probability of over channel utilization and the possibility of unstable system behavior because the remote units do not attempt to continue to access the contention-type access block 162 after a collision has occurred.

Figure 4:
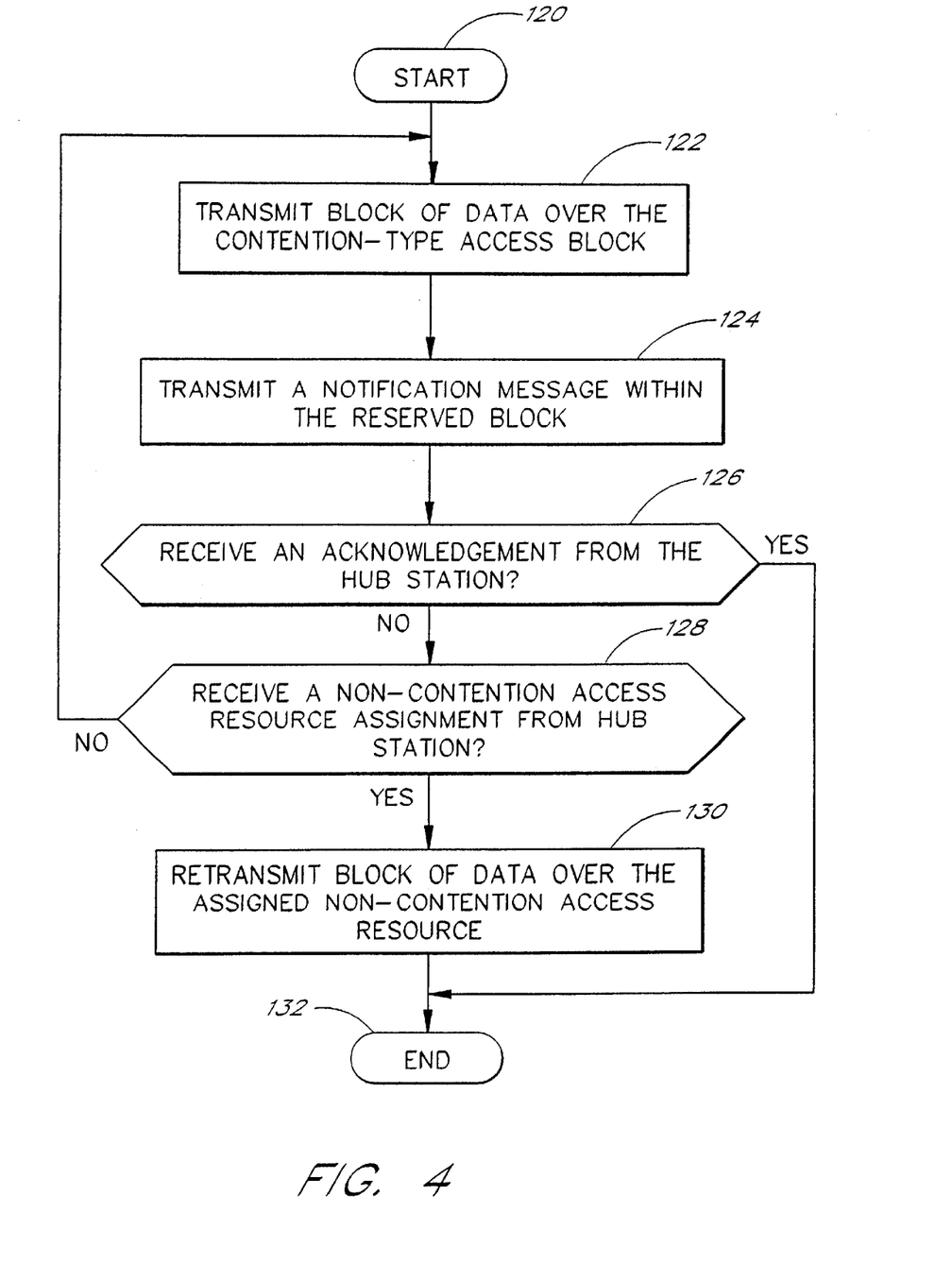
FIG. 4 is a flow diagram showing remote unit operation.

FIG. 4 is a flow diagram showing remote unit operation. Flow begins in start block 120. In block 122, the remote unit transmits a block of data over the contention-type access block. In a system that uses a pure ALOHA random access scheme, block 122 may involve simply transmitting the block of data as soon as the packet becomes available. In other systems, block 122 may comprise randomly selecting a random access channel from a set of available random access channels. In yet other systems, block 122 may comprise the step of attempting to sense the use of the contention-type access block by other units. In block 124, the remote unit transmits a notification message within the reserved block. The steps of blocks 122 and 124 may be performed in the opposite order, or may be performed concurrently. In block 126, the remote unit determines whether it has received an acknowledgment message from the hub station within an acknowledgment time-out period. If so, flow ends in end block 132. If not, in block 128 the remote unit determines whether it has received a response message from the hub station designating a resource within the non-contention access block. If so, the remote unit retransmits the block of data over the assigned resource in block 130. In the rare event that the remote unit receives neither an acknowledgment message nor a response message, flow may continue back to block 122.

Figure 5:
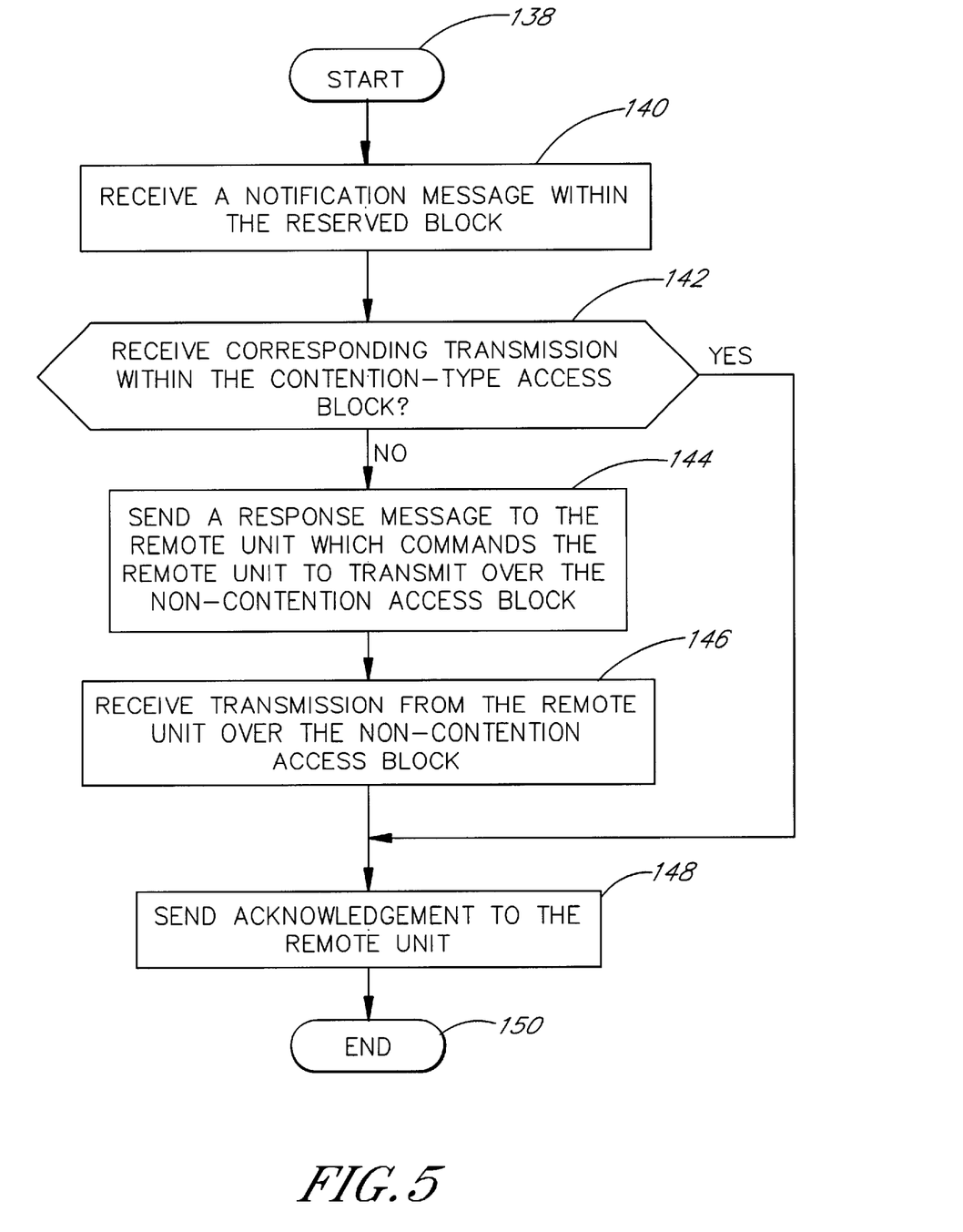
FIG. 5 is a flow diagram showing hub station operation.

FIG. 5 is a flow diagram showing hub station operation. Flow begins in start block 138. In block 140, the hub station receives a notification message within the reserved block corresponding to a particular remote unit. Block 142 determines whether a corresponding block of data within the contention-type access block has been received within a specified time-out period surrounding the receipt of the notification message. If so, the hub station sends an acknowledgment message to the remote unit in block 148 and flow ends in end block 150. If not, in block 144, the hub station sends a responsive message commanding the remote unit to transmit over the non-contention access block. In block 146, the hub station receives the block of data from the remote unit over the non-contention access block. In block 148, the hub station sends an acknowledgment message to the remote unit and flow ends in end block 150.

In order to prevent over-channel-utilization, the loading of the contention-type access block is generally kept below a maximum loading threshold by the system design. If the system can predict the probability of a remote unit transmission with an accuracy at least approximately equal to the maximum allowable loading, system efficiencies can be increased by predictive scheduling. For example, if the system is designed to limit the loading on the contention-type access block to approximately 10% of its total available capacity and the hub station can predict a remote unit transmission with an accuracy better than 10%, the hub station can increase total system usage efficiency by selecting a resource from the non-contention access block for use by the remote unit if the remote unit should have a transmission to send. Using predictive scheduling, the non-contention access block resources are used at less than full capacity but the efficiency and stability of the system is increased.

Often times the receipt of a block of data from the remote unit is followed quickly by the receipt of another block of data, especially in response to an intervening hub station message. Therefore, when a hub station receives a block of data from the remote unit or a notification message in association with a failed transmission, the hub station may include a predictive resource assignment within the acknowledgment message. The predictive resource assignment may designate a resource within the non-contention access block. In this way, the acknowledgment message containing the predictive resource assignment tells the remote unit "I have received your latest transmission and should you have a transmission to send within the next X seconds, please send it within the non-contention access block at resource Y." Should the remote unit have an additional block of data to send, rather than use the contention-type access block, the remote unit initially transmits the data over the indicated resource within the non-contention access block. Likewise, when the hub station transmits a block of data to the remote unit, the hub station may include a predictive resource assignment within the message carrying the block of data. In addition, the predictive resource assignment may be sent as an independent message or in a responsive message to a failed transmission. By using predictive scheduling, the contention-type access block 162 may be further unburdened, thereby decreasing the number of collisions as well as the average delay incurred within the system and further increasing the throughput and stability of the system.

Referring again, to FIG. 5, in order to implement predictive scheduling, in block 148, the hub station may include within an acknowledgment message to the remote unit a predictive resource assignment for use by the remote unit for any transmission which it may generate for a limited time duration. If the original transmission failed, the hub station may include within the message sent in block 144 a predictive resource assignment which may be used for subsequent transmissions by the remote unit so long as they begin within a limited duration of time. The inclusion or exclusion of a predictive resource assignment in one of these messages or in another message may be a function of, for example, current system loading, the characteristics of the inbound or outbound user data or the characteristics of the remote unit. In one embodiment, the remote unit indicates the desire for a non-contention resource within the message transferred over the contention resource.

In another embodiment, the rigid separation of the contention-type access block 162 from the non-contention access block 164 in FIG. 3 is replaced with a movable separation. If the contention-type access block 162 and the non-contention access block 164 use a common communication format, the hub station can simply notify the remote units of the current channel which divides the contention-type access block 162 from the non-contention access block 164 in order to inform the remote unit of the current location of the movable separation. Under conditions of light loading, the communication resources allocated to the contention-type access block 162 may be increased while the communication resources allocated to the non-contention access block 164 may be decreased. In this way, the probability of collision is decreased and the mean delay introduced by the system also is decreased. As the loading of the system increases, the incidence of collision also increases and the amount of data transmitted over the non-contention access block 164 increases. At this point, in order to accommodate the increased loading on the non-contention access block 164, the communication resources allocated to the non-contention access block 164 may be increased. Taken to the extreme, should the loading on the contention-type access block 162 become so high that it is dominated by collisions, the communication resources allocated to the contention-type access block 162 may be minimized or even eliminated. In such a case, each transmission over the contention-type access block 162 generates a collision and the system reduces to a scheduled system based upon the use of the reserved block 160 as a means of requesting a scheduled resource. The use of a moveable boundary between the resources allocated to the contention-type access block 162 and the non-contention access block 164 allows the system to operate efficiently over a large range of loading conditions.

The reserved block transmissions may be used to derive time alignment (synchronization) and power control information for the remote units according to well-known techniques—whether or not the reservation block transmission indicates the transmission of a block of data over the contention-type resource. For example, by examination of the transmission received over the reserved block, the hub station may generate a time adjustment command or information, or power adjustment command or information for transmission to the remote unit using well-known techniques. Several techniques for time alignment are disclosed in assignee's co-pending application entitled METHOD AND APPARATUS FOR TIME SYNCHRONIZATION IN A COMMUNICATION SYSTEM, application Ser. No. 09/354,934, filed Jul. 15, 1999, which claims priority to a provisional application having the same title, Ser. No. 60/095,341, filed Aug. 8, 1998. Use of the reserved block for these functions may be advantageous because the remote unit can transmit actual or dummy messages over the reserved block without expending any additional system resources and without the risk of collision. By using the reserved block to implement these overhead functions, the loading on the contention-type access block and non-contention access block may be further decreased.

In one embodiment, the reserved block transmissions reflect an amount of data transmitted over the contention-type resource. For example, in one embodiment, the reserved block transmission is a payload message which indicates the number of packets transmitted over the contention-type resource. If the hub station detects less than the indicated amount of data on the contention-type resource, the hub station assigns a non-contention resource of sufficient size to support transmission of the amount of data which was not received and notifies the remote unit. The remote unit responds by re-transmitting data over the non-contention resource.

In such an embodiment, if a remote unit is transmitting an isochronous data or another type of data where the need for communication resources can be predicted by the remote unit, the remote unit can transmit a payload message over the reserved block indicating the transmission of the predicted amount of resources before the data is available for transmission. However, the remote unit does not transmit a corresponding message on the contention-type resource. Therefore, the hub station receives the reserved block transmission but not a corresponding contention-type resource transmission and responds with a non-contention resource allocation. The remote unit transmits the data over the non-contention resource when the data is available without incurring the delay of scheduling or the probability of collision on the contention-type resource. In addition, because the remote unit does not transmit a message over the contention-type resource, the loading and number of collisions on the contention-type resource is reduced.

In some cases, a remote unit transmits predictable data as well as a more unpredictable stream of data. For example, a remote unit may transmit concurrently both a predictable rate voice signal and an unpredictable data signal. In such a case, the remote unit can add the amount of predicted resources to the payload indication sent over the reserved block transmission. For example, if the remote unit has five data packets to transmit and can predict that it will have two additional voice packets to transmit, the remote unit transmits the five data packets over the contention-type resource and transmits a corresponding message over the reserved block indicating that seven data packets are being transmitted. The hub station receives the reserved block transmission and the five data packets and schedules a sufficient non-contention resource to transmit the remaining two packets.

In yet another embodiment, the remote unit transmits a message over the reserved block which indicates the amount of data queued for transmission. For example, the remote unit indicates that a message has been sent over the contention-type resource and that a certain amount of data remains available for transmission. The information concerning queue length can be used by the hub station to allocate the system resources. In practice, this embodiment is a special case of the embodiment described above in which the remote unit transmits a reserved block message which indicates that a greater amount of data is transmitted than is actually transmitted and in which when the hub station assigns a non-contention resource of sufficient size to support transmission of the amount of data which was not received. In effect, the difference between the amount of data transferred and the amount of data indicted in the message is equal to the queue size.

In some systems, the total amount of reverse link power which can be transmitted concurrently is limited. For example, the reverse link power may be limited by a satellite transponder compression point or by government regulation. If a great number of remote units attempt to access the system via the contention-type resource at one time, the total power may exceed the reverse link power limit. In such a case, it is advantagous to limit the total amount of power which can be transmitted at one time. One manner in which this can be accomplished is by limiting the number of remote units which can transmit in any given contention-type resource segment. Therefore, rather than being allowed to transmit on each one of a set of resource segments from within said contention-type resource, the remote units are generally enabled to transmit on only a subset of the possible contention-type resource segments. For example, if the contention-type resource is a slotted ALOHA system, the remote unit may be enabled to begin transmission on a subset of the possible transmission boundaries. If the resources are properly allocated, even if each remote unit which is enabled to transmit within a segment transmits within the segment, the total power is still held within the allowable limit. In one embodiment, the remote units receive enablement allocations in accordance with a class of service designation. In other embodiments, particular messages or message types are deemed to have a higher priority than others and the enablement allocations are distributed based on the type of message.

The transmission over the reserved block need not be concurrent with the transmission over the contention-type access block. A transmission over the reserved block may indicate that a transmission has been recently made over the contention-type access block, that a transmission is concurrently made over the contention-type access block or that a transmission will soon follow over the contention-type access block.

In yet another embodiment, the resources of the reserved block can be non-uniformly allocated among the remote units. For example, the resources can be allocated based upon a set of active and quiescent remote units. The active remote units are those remote units which are more likely to transmit data. The quiescent remote units are those remote units which are less likely to transmit data. If no transmissions are received from an active remote unit for an extended period of time, the hub station can re-categorize the remote unit as a quiescent remote unit. If a transmission from a quiescent remote unit is received, the hub station can re-categorize the remote unit as an active remote unit. The active remote units are allocated more frequent access to the reserved block than the quiescent remote units. Likewise, the resources of the reserved block may be allocated among the remote units according to a quality of service allocated to the user, the data transmission capability of the remote unit, the past usage pattern of the remote unit or the length of time since the last transmission was received from the remote unit. Non-uniform allocation of the reserved block resources can aid in reducing the overall latency introduced in the system by the use of the reserved block.

Likewise, the total amount of system resource dedicated to the reserved block can be varied during system operation. For example, the rigid separation of reserved block 160 and the contention-type access block 162 and the non-contention access block 164 in FIG. 3 can be replaced with a movable separation. By increasing the amount of resources allocated to the reserved block, the overall latency of the system due to the use of the reserved block can be reduced. However, increasing the amount of resources allocated to the reserved block reduces the amount of resources which can be allocated to the other access resources. Thus, when sufficient resources are available on the contention-type resource and the non-contention resource, additional resources can be allocated to the reserved block. As the loading on the contention-type resource and the non-contention resource increases, the amount of resources allocated to the reserved block can be reduced.

As noted above, the communication format used on the reserved block, the contention-type access block and the non-contention access block need not be the same. A myriad of well known and later developed communication formats may be directly applied to the teachings of the invention. Typically, the non-contention access and the contention-type access block use a common communication format and channelization for ease of implementation. For example, the contention-type access block may be assigned a number of time and frequency slots and the non-contention access block may be assigned the remaining time and frequency slots available in the system. Alternatively, or in combination, the contention-type access block may be assigned a first set of orthogonal codes for use in a spread spectrum system while the non-contention access block may be assigned a remaining series of codes. In addition, frequency hopping techniques can also be used. It is likely, however, that the reserved block operates according to some different communication format. An important characteristic of the reserved block is that it comprises a sufficient number of discrete resources so that each active remote unit may be assigned a unique resource. It is also important that the transmission delay associated with sending a signal over the reserved resource be limited to some reasonable value. If the time delay associated with successive transmissions from a single remote unit over the reserved block becomes too large, the delay may become significant in determining the delay associated with a retransmission over the non-contention access block.

The invention may be embodied in a variety of systems in which multiple units compete for access to a finite resource. Such systems include wireless terrestrial systems and wireline systems. In one embodiment, the non-contention access block may be used only after the block of data has been subject to two or more collisions on the contention-type access block.

The invention may be embodied in other specific forms without departing from its spirit or essential characteristics. The described embodiment is to be considered in all respects only as illustrative and not as restrictive and the scope of the claim of the invention is, therefore, indicated by the appended claims rather than by the foregoing descriptions. All changes which come within the meaning and range of equivalency of the claims are to be embraced within their scope.

What is claimed is:

1. In a communication system in which a plurality of remote units transmit data to a hub station, a method of communicating comprising:

transmitting a block of data from at least one of said remote units to the hub station over a contention-type access communication resource;

transmitting a notification message from said at least one remote unit to the hub station over a first non-contention access channel to notify the hub station of transmitting said block of data over said contention-type access communication resource; and in response to receiving said notification message, determining, in said hub station, whether transmitting said block of data over said contention-type communication resource was successful, and transmitting a response message from the hub station to the remote unit to command the remote unit to transmit said block of data over a resource within a second non-contention access communication resource if transmitting said block of data over said contention-type access communication resource was unsuccessful, whereby said remote unit becomes configured to communicate with said hub station using a non-contention communication resource while other remote units of the system remain configured to communicate with the hub station using a contention communication resource.

2. The method of claim 1, wherein said response message designates said resource within said second non-contention access communication resource.

3. The method of claim 1, wherein transmitting said block of data further comprises selecting an enabled resource from among a set of resource segments within said contention-type communication resource.

4. The method of claim 1, wherein said notification message indicates a first amount of data which is larger than a second amount of data in said block of data.

5. The method of claim 1, wherein said notification message indicates a first amount of data in said block of data.

6. The method of claim 5, wherein said resource within said non-contention access communication resource is of sufficient size to support transmission of a difference between said first amount of data and a second amount of data received by said hub station.

7. The method of claim 5, wherein said resource within said non-contention access communication resource is of sufficient size to support transmission of said first amount of data.

8. The method of claim 1, further comprising transmitting an acknowledgment message from the hub station to the remote unit to command the remote unit to transmit any additional data available within a limited time duration over a resource within said second non-contention access communication resource.

9. The method of claim 1, wherein transmissions over said contention-type access communication resource are subject to collisions and wherein transmissions over said reserved communication resource and said non-contention access communication resource are not subject to collisions.

10. The method of claim 1, further comprising receiving a predictive resource designation indicating a predictive resource within said non-contention access communication resource for use if an additional block of data is available for transmission within a limited time duration.

11. The method of claim 1, wherein said corresponding notification message is used to generate power adjustment information for said remote unit.

12. The method of claim 1, wherein said corresponding notification message is used to generate time adjustment information for said remote unit.

13. The method of claim 1, wherein said collision-type access communication resource comprises a set of code division multiple access channels.

14. The method of claim 1, wherein said contention-type access communication resource comprises a set of time division multiple access channels.

15. The method of claim 1, wherein an amount of total communication resources apportioned to said contention-type access communication resource decreases as system loading increases.

16. The method of claim 1, wherein an amount of total communication resources apportioned to said non-contention access communication resource increases as system loading increases.

17. The method of claim 1, wherein said block of data comprises Internet communication data.

18. The method of claim 17, wherein each step of transmitting comprises the step of transmitting over a wireless satellite link.

19. In a system in which multiple remote units compete for limited communication resources, a method of accessing the system by a remote unit comprising:

transmitting a block of data over a contention-type access communication resource;

transmitting a corresponding notification message over a reserved communication resource, wherein said set of resources allocated to said reserved communication resource constitute less than about 5% of said limited communication resources;

receiving a response message which commands transmission of said block of data over a resource within a non-contention access communication resource in response to successful reception of said corresponding notification message and failed reception of said block of data; and transmitting said block of data over said non-contention access communication resource.

* * * * *